United States Patent
Kada et al.

(10) Patent No.: US 12,478,651 B2
(45) Date of Patent: Nov. 25, 2025

(54) COMPOSITION FOR IMPROVING GUT MICROBIOTA

(71) Applicant: MEGMILK SNOW BRAND CO., LTD., Hokkaido (JP)

(72) Inventors: Shigeki Kada, Hokkaido (JP); Takuya Tsukahara, Hokkaido (JP); Akira Kimura, Hokkaido (JP); Nana Ogawa, Hokkaido (JP)

(73) Assignee: MEGMILK SNOW BRAND CO., LTD., Hokkaido (JP)

( * ) Notice: Subject to any disclaimer, the term of this patent is extended or adjusted under 35 U.S.C. 154(b) by 451 days.

(21) Appl. No.: 17/917,385

(22) PCT Filed: Apr. 7, 2021

(86) PCT No.: PCT/JP2021/014696
§ 371 (c)(1),
(2) Date: Oct. 6, 2022

(87) PCT Pub. No.: WO2021/206106
PCT Pub. Date: Oct. 14, 2021

(65) Prior Publication Data
US 2023/0149482 A1    May 18, 2023

(30) Foreign Application Priority Data

Apr. 8, 2020 (JP) .................................. 2020-069719
Sep. 23, 2020 (JP) .................................. 2020-158770

(51) Int. Cl.
*A61P 1/00* (2006.01)
*A23L 33/135* (2016.01)
*A61K 35/747* (2015.01)
*A61P 1/14* (2006.01)
*G01N 33/92* (2006.01)

(52) U.S. Cl.
CPC .......... *A61K 35/747* (2013.01); *A23L 33/135* (2016.08); *A61P 1/14* (2018.01); *G01N 33/92* (2013.01)

(58) Field of Classification Search
None
See application file for complete search history.

(56) References Cited

U.S. PATENT DOCUMENTS

| | | |
|---|---|---|
| 2003/0133921 A1 | 7/2003 | Ohishi et al. |
| 2006/0068047 A1 | 3/2006 | Ohishi et al. |
| 2015/0050254 A1 | 2/2015 | Kelly |
| 2015/0329923 A1 | 11/2015 | Stanton et al. |
| 2017/0173089 A1 | 6/2017 | Kelly |
| 2019/0015465 A1 | 1/2019 | Possemiers et al. |
| 2019/0069586 A1 | 3/2019 | Kyle et al. |
| 2019/0216865 A1 | 7/2019 | Kelly |
| 2019/0224254 A1 | 7/2019 | Kyle et al. |
| 2019/0290706 A1 | 9/2019 | Biffi et al. |

FOREIGN PATENT DOCUMENTS

| | | |
|---|---|---|
| JP | 2006-136240 A | 6/2006 |
| JP | 2015-198638 A | 11/2015 |
| JP | 6482135 B2 | 3/2019 |
| JP | 2019-511563 A | 4/2019 |
| WO | 01/87317 A1 | 11/2001 |
| WO | 2008/001676 A1 | 1/2008 |
| WO | 2013/093561 | 6/2013 |
| WO | 2017/134240 | 8/2017 |

OTHER PUBLICATIONS

De Moraes, Georgia Maciel Dias, et al. "Functional properties of *Lactobacillus mucosae* strains isolated from Brazilian goat milk." Probiotics and Antimicrobial Proteins 9 (2017): 235-245. (Year: 2017).*

Han, Sang-Kap, and Dong Hyun Kim. "*Lactobacillus mucosae* and Bifidobacterium longum synergistically alleviate immobilization stress-induced anxiety/depression in mice by suppressing gut dysbiosis." (2019): 1369-1374. (Year: 2019).*

Nishijima et al., "The Gut Microbiome of Healthy Japanese and its Microbial and Functional Uniqueness", *DNA Research*, vol. 23, No. 2, pp. 125-133 (2016).

Dewhirst et al., "Phylogeny of the Defined Murine Microbiota: Altered Schaedler Flora", *Appl. Environ. Microbiol.*, vol. 65, No. 8, pp. 3287-3292 (1999).

McNulty et al., "The Impact of a Consortium of Fermented Milk Strains on the Gut Microbiome of Gnotobiotic Mice and Monozygotic Twins", *Sci. Transl. Med.*, vol. 3, No. 106, 106ra106, pp. 1-26 (2011).

Gotoh et al., "Use of Gifu Anaerobic Medium for Culturing 32 Dominant Species of Human Gut Microbes and its Evaluation Based on Short-chain Fatty Acids Fermentation Profiles", *Biosci. Biotechnol. Biochem.*, vol. 81, No. 10, pp. 2009-2017 (2017).

(Continued)

*Primary Examiner* — Louise W Humphrey
*Assistant Examiner* — Mary A Crum
(74) *Attorney, Agent, or Firm* — GREENBLUM & BERNSTEIN, P.L.C.

(57) ABSTRACT

An object of one present invention is to provide a food composition including, as an active ingredient thereof, *Lactobacillus mucosae* that has a function of improving a gut microbiota. An object of another present invention is to provide an increasing drug for the rate of bifidobacteria in the human intestine and a bifidobacteria proliferation promoting drug, including *Lactobacillus mucosae* as an active ingredient thereof. The one present invention provides a composition for improving the gut microbiota, including the bacterial cell or a culture of *Lactobacillus mucosae* as an active ingredient thereof. The other present invention provides an increasing drug for the rate of bifidobacteria in the human intestine and a bifidobacteria proliferation promoting drug, including *Lactobacillus mucosae* as an active ingredient thereof.

3 Claims, No Drawings

(56) References Cited

OTHER PUBLICATIONS

Sasaki et al., "Low Amounts of Dietary Fibre Increase In Vitro Production of Short-chain Fatty Acids without Changing Human Colonic Microbiota Structure", *Sci. Rep.*, vol. 8, No. 1, art. 435, pp. 1-9 (2018).

Valeriano et al., "In Vitro Evaluation of the Mucin-adhesion Ability and Probiotic Potential of *Lactobacillus mucosae* LM1", *J. Appl. Microbiol.*, vol. 117, No. 2, pp. 485-497 (2014).

Wang et al., "Probiotic Potential of *Lactobacillus* on the Intestinal Microflora against *Escherichia coli* Induced Mice Model through High-throughput Sequencing", *Microb. Pathog.*, No. 137, 103760, pp. 1-9 (2019).

International Search Report issued in PCT/JP2021/014696, dated Jun. 15, 2021, along with an English translation thereof.

Written Opinion of the International Searching Authority issued in PCT/JP2021/014696, dated Jun. 15, 2021, along with an English translation thereof.

International Preliminary Report on Patentability issued in PCT/JP2021/014696 on Oct. 6, 2022, along with an English translation thereof.

Office Action issued in TW Patent Application No. 110112459, dated Feb. 7, 2025, along with a machine English translation.

Office Action issued in CN Patent Application No. 202180040818.4, dated Jul. 2, 2024, along with a machine English translation.

Office Action issued in JP Patent Application No. 2020-069719, dated May 21, 2024, along with a machine English translation.

Manninen et al., "Alteration of the Canine Small-Intestinal Lactic Acid Bacterium Microbiota by Feeding of Potential Probiotics," *Appl. Environ. Microbiol.*, vol. 72, No. 10, pp. 6539-6543 (2006).

Fakhry et al., "Characterization of Intestinal Bacteria Tightly Bound to the Human Ileal Epithelium," *Res. Microbiol.*, vol. 160, No. 10, pp. 817-823 (2009).

Extended European Search Report issued in EP Patent Application No. 21784014.9, dated Jun. 21, 2024.

Office Action issued in CN Patent Application No. 202180040818.4, dated Nov. 24, 2023, along with a machine English translation.

Office Action issued in JP Patent Application No. 2020-069719, mailed Oct. 8, 2024, along with a machine English translation.

Office Action issued in CN Patent Application No. 202180040818.4, dated Apr. 12, 2024, along with a machine English translation.

Office Action issued in JP Patent Application No. 2021-115182, dated Jun. 10, 2025, along with a machine English translation.

Office Action issued in JP Patent Application No. 2021-115182, dated Oct. 7, 2025, along with a machine English translation.

\* cited by examiner

COMPOSITION FOR IMPROVING GUT MICROBIOTA

TECHNICAL FIELD

The present invention relates to a food composition for improving gut bacteria that includes *Lactobacillus mucosae* as an active ingredient thereof, and a method for evaluating a food composition suitable for improving a gut microbiota.

The present invention further relates to a drug for increasing the rate of bifidobacteria in the human intestine, and a food and drink for promoting an increase of the rate thereof, that each include *Lactobacillus mucosae* as an active ingredient thereof. The present invention yet further relates to a drug for promoting proliferation of bifidobacteria, and a food and drink for promoting proliferation of bifidobacteria, that each include *Lactobacillus mucosae* as an active ingredient thereof.

BACKGROUND ART

As many as 40 trillion bacteria of 1,000 species colonized in the human intestine and form complicated symbiotic relationships with each other (gut microbiota). Because of the advancement of the omics analysis, it has turned out that the health condition, aging, the diet, and the lifestyle influence the gut microbiota and, in addition, that a disorder of the balance in the gut microbiota (the diversity of the gut bacteria) leads to the onset or exacerbation of a disease. It has also been demonstrated that the diversity of the gut bacteria is reduced in obese patients and diabetic patients and that ingestion of dietary fibers causes increase the diversity of the gut bacteria and the related clinical symptoms are thereby improved.

As to short-chain fatty acids that are the main metabolic product of the gut bacteria, various health functional effects have been reported and their relation with the diversity of the gut bacteria has also been suggested. The short-chain fatty acids refer to the fatty acids each having the carbon atom number of six or smaller, that are represented by acetic acid, propionic acid, and butyric acid. These acids not only suppress growth of the pathogenic microorganisms by making the intestinal pH to be acidic but also activate the intestinal epithelium cells and are therefore intricately involved in the biological defense and the control of the immunity system of the host. It has also been reported that these short-chain fatty acids are utilized by the gut bacteria producing the metabolic products that promote the intestinal peristalsis, the gut bacteria related to the maintenance of the homeostasis of the intestinal mucosa, and the like. Examples of the method for increasing the diversity of the gut bacteria constituting the gut microbiota and increasing the short-chain fatty acids in the gut microbiota mainly include ingesting a composition for a food, that promotes the growth of the gut bacteria and production of the metabolic products thereof (a prebiotics), and directly ingesting a composition for a food, that includes lactic acid bacteria or bifidobacteria (a probiotics).

The human gut microbiota including a wide variety of gut bacteria is significantly different from that of animal models such as a mouse that has *Lactobacillus* as the major bacteria in the intestine thereof. It is also known, as to the human, that the gut microbiota differs among individuals and, in addition, that the gut microbiota of Japanese are characteristic compared to those of other country people (Non-Patent Document 1). In the present state where no model evaluation system is present for standardizing the dispersion of the gut microbiota among individuals and races, it is extremely difficult to select a food composition that increases the diversity of the gut bacteria constituting the gut microbiota and that increases the short-chain fatty acids in the gut microbiota.

Plural evaluation in-vitro systems that each facilitate the standardization by extracting plural gut bacteria from the gut microbiota and artificially reconstruct a gut microbiota have been reported (Non-Patent Document 2 and Non-Patent Document 3) while no artificially reconstructed gut microbiota of Japanese has been reported. No evaluation system is present that is constructed for the purpose of selecting a food composition that increases the diversity of the gut bacteria constituting the gut microbiota and that increases the short-chain fatty acids in the gut microbiota.

Non-Patent Document 1 reports 50 species of gut bacteria that are major in the gut microbiota of Japanese as the result of clarification of the feature of the gut microbiota of Japanese by a metagenomic analysis of their gut microbiota, and also reports that the gut microbiota of Japanese most abundantly include *Blautia, Bifidobacterium, Collinsella*, and *Streptococcus* compared to the gut microbiota of 11 other nations. The above 50 species do not include Proteobacteria and *Lactobacillus*, and it has turned out that these gut bacteria are not the gut bacteria that are major in the intestines of Japanese. It has further turned out from the metagenomics data of 106 Japanese collected in Non-Patent Document 1 that, as to the taxonomic rate in the gut microbiota of Japanese, the gut bacteria belonging to Firmicutes, Actinobacteria, and Bacteriodetes are included respectively at about 57%, about 24%, and about 19% as number of bacterial species. The gut bacteria that are major in the gut microbiota of Japanese have however not been cultured, and the combination thereof capable of being cultured and the culture method therefor also have not been studied.

As to the number of bacterial species to be selected, Non-Patent Document 2 reports a community of 8 species of the gut bacteria called Altered Schaedler Flora (ASF) as a minimum unit model of the gut microbiota. Non-Patent Document 3 reports a community of 15 species of the gut bacteria as a model having the feature of the gut microbiota of European. This community however includes the gut bacteria that are not major in the gut bacteria of Japanese and does not include *Bifidobacterium* that is also the feature of the gut microbiota of Japanese.

The gut bacteria have a high anaerobic demanding property compared to lactic acid bacteria and bifidobacteria, and are extremely difficult to be cultured. Each of the gut bacteria is therefore generally cultured using a culture medium that matches with the feature thereof. Non-Patent Document 4 reports that plural species of gut bacteria for which their predominance in the gut microbiota of European has been reported are able to be cultured using a culture medium (a GAM bouillon culture medium from Nissui Pharmaceutical Co., Ltd.). The major bacteria in the intestine are however significantly different between European and Japanese as above, and it cannot therefore be expected that the major gut bacteria of Japanese are stably grown using the above culture medium as the above. In addition, although the amount of the short-chain fatty acids produced by each of the bacterial species were compared, said the amount of short-chain fatty acids were only produced by a single gut bacteria, and the produced amount of the short-chain fatty acids as a whole of the flora was not clarified.

Patent Document 1 reports a gut microbiota simulation culture method and a culturing device, that enable culture to be conducted mostly maintaining the compositional balance of the gut microbiota. Non-Patent Document 5 evaluates in vitro the fact that dietary fibers increase the short-chain fatty acids in the intestine bacterial flora using a method and a device that are similar to the above. Use of feces as the culture to be evaluated is described as the feature in both of Patent Document 1 and Non-Patent Document 5, while the gut microbiota of the human differs among individuals and, when the feces of human origin are used, the evaluation is influenced by the difference in the gut microbiota among the individuals who each present the feces. The selection of the food composition that increases the diversity of the gut bacteria constituting the gut microbiota and that increases the short-chain fatty acids in the gut microbiota, based on the use of the feces is therefore limited, and construction of an evaluation system that uses no feces has therefore been demanded. A composition for improving the gut microbiota that promotes increase of the diversity of the gut microbiota and an increase of the production of the short-chain fatty acids has also been demanded.

It has been reported that the balance of the bacterial species in the gut microbiota varies depending on the health condition and the age, and the rates of the bifidobacteria and the lactic acid bacteria of the gut bacteria also decrease. As a method of supplementing of decreasing bifidobacteria and lactic acid bacteria, ingesting of a fermented milk product containing these bacteria is one solution.

Examples of the representative species of lactic acid bacteria used in a fermented milk product include lactic acid bacteria belonging to *Lactobacillus*. Examples of the generally used bacterial species include *Lactobacillus delbrueckii*, subsp. *bulgaricus, Lactobacillus casei, Lactobacillus gasseri, Lactobacillus reuteri*, and *Lactobacillus helveticus*. On the other hand, examples of the bacterial species not used or utilized so often include *Lactobacillus mucosae*.

Patent Document 2 lists *Lactobacillus mucosae* as one of the lactic acid bacteria that are useful for improving lactose intolerance. *Lactobacillus mucosae* in Patent Document 2 is characterized by its mucin-adhesion ability and its high lactose degradation capacity, while it does not describe its action applied to the rate of the bifidobacteria in the human intestine and its action applied to the proliferation of the bifidobacteria in vitro.

Because lactose promotes proliferation of the bifidobacteria, it can also be considered for ingesting *Lactobacillus mucosae* that has high lactose degradation capacity, that the rate of the bifidobacteria in the human intestine may be decreased and the proliferation of the bifidobacteria may be obstructed.

Non-Patent Documents 6 and 7 indicate for *Lactobacillus mucosae* LM1 of isolated by piglet origin that this bacterium has a mucin-adhesion ability and suppresses adhesion of any pathogenic bacterium to the intestinal mucosa. Non-Patent Documents 6 and 7 both however do not indicate the action applied to the bifidobacteria by *Lactobacillus mucosae* LM1.

Non-Patent Document 6 describes an example where a mucin-adhesion ability is analyzed in vitro and does not indicate any effect for the human. Non-Patent Document 7 describes an analysis on suppression of adhesion of any pathogenic bacteria to the intestinal mucosa using a mouse and does not indicate any effect for the human.

As above, no indication has been made so far for the action of promoting proliferation of bifidobacteria of *Lactobacillus mucosae* and the action of increasing the rate of bifidobacteria in the human intestine thereof, and any method therefor has also been unknown.

FREE TEXT CITATION LIST

Patent Literature

Patent Document 1: Japanese Patent Publication No. 6482135
Patent Document 2: WO 2008-001676

Non Patent Literature

Non-Patent Document 1: DNA Res. 2016 April; 23(2): 125-33
Non-Patent Document 2: Appl Environ Microbiol. 1999 August; 65(8): 3287-92.
Non-Patent Document 3: Sci Trans' Med. 2011 Oct. 26; 3(106): 106ra106.
Non-Patent Document 4: Biosci Biotechnol Biochem. 2017 October; 81(10): 2009-2017.
Non-Patent Document 5: Sci Rcp. 2018 Jan. 11; 8(1): 435.
Non-Patent Document 6: J. Appl Microbiol. 2014, No. 117, Vol. 2, pp. 485-497.
Non-Patent Document 7: Microb. Pathog. 2019, No. 137, 103760

SUMMARY OF INVENTION

Technical Problem

An object of the present invention is to provide a food composition, and a food and drink including, as an active ingredient thereof, *Lactobacillus mucosae* that has a function of improving the gut microbiota, that is, a function of increasing the short-chain fatty acids and/or a function of increasing the diversity. Another object of the present invention is to construct a novel gut microbiota model that has the feature of the gut microbiota of Japanese, to provide a new model evaluation system capable of evaluating the function of improving the gut microbiota, that is, the function of increasing the short-chain fatty acids and/or the function of increasing the diversity, using the above model, and to provide a screening method for the food composition using the model evaluation system. A further object of the present invention is to provide a food and drink that each have the gut microbiota improving function, that is, the short-chain fatty acids increasing function and/or the diversity increasing function, and that each use the food composition acquired using a new evaluation method and the new screening method.

Another object of the present invention is to provide a new probiotic. This object is to provide especially an increasing drug for the rate of bifidobacteria in the human intestine, and a food and drink for increasing the rate thereof, which are including *Lactobacillus mucosae* as an active ingredient thereof. A further object of the present invention is to provide a bifidobacteria proliferation promoting drug, and a food and drink for promoting proliferation of bifidobacteria, including *Lactobacillus mucosae* as an active ingredient thereof.

Solution to Problem

The present invention is to solve the above problems, and plural gut bacteria that are major in the gut microbiota of Japanese were extracted to artificially reconstruct a gut microbiota of Japanese. In this reconstruction, the extraction was conducted considering that maintenance of the intestinal taxonomic rate and inclusion of the gut bacteria each showing a high abundance rate compared to those of foreigners are the features of the gut microbiota of Japanese. Using a mixture of the extracted gut bacteria as a culture for evaluation, indigestible dietary fibers for which the fact was already reported that ingesting these fibers increased the short-chain fatty acids in the human intestine, were cultured together with the above culture, and an increase of the short-chain fatty acids was confirmed with excellent reproducibility. From this, it has been demonstrated that the present invention is effective as a model evaluation system for the gut microbiota of Japanese, that standardizes the dispersion of the gut microbiota among individuals, and it has been found out that the present invention is also usable for evaluation of an increase of the short-chain fatty acids in the gut microbiota of Japanese. Similarly, it has been found out that this model evaluation system can also be utilized for evaluation of increase of the diversity of the gut bacteria constituting the gut microbiota.

As to the present invention, various species of lactic acid bacterium and *Bifidobacterium* were screened as a composition for food, having a short-chain fatty acids increasing function and a diversity increasing function using the model evaluation system for the gut microbiota of Japanese and, as a result, it has been confirmed that *Lactobacillus mucosae* has the functions. The short-chain fatty acids increase promoting function and the diversity increase promoting function of *Lactobacillus mucosae* have not been known so far and it has turned out that *Lactobacillus mucosae* is usable for a short-chain fatty acids increase promotion use and a diversity increase promotion use in the gut microbiota of Japanese.

The present invention includes the following configurations.

<1>
A composition for improving a gut microbiota, comprising a bacterial cell or a culture of *Lactobacillus mucosae* as an active ingredient thereof.
<2>
A food and drink for improving a gut microbiota, comprising a bacterial cell or a culture of *Lactobacillus mucosae* as an active ingredient thereof.
<3>
A composition for promoting an increase of short-chain fatty acids, comprising a bacterial cell or a culture of *Lactobacillus mucosae* as an active ingredient thereof.
<4>
A food and drink for promoting an increase of short-chain fatty acids, comprising a bacterial cell or a culture of *Lactobacillus mucosae* as an active ingredient thereof.
<5>
A composition for promoting an increase the diversity of gut bacteria, comprising a bacterial cell or a culture of *Lactobacillus mucosae* as an active ingredient thereof.
<6>
A food and drink for promoting an increase the diversity of gut bacteria, comprising a bacterial cell or a culture of *Lactobacillus mucosae* as an active ingredient thereof.
<7>
A human gut microbiota model to evaluate a short-chain fatty acids increase promoting action and/or a diversity increase promoting action in a human intestine of a target food composition, the human gut microbiota model comprising a culture for evaluation, comprising at least 9 or more species that comprises no bacterium belonging to Proteobacteria and *Lactobacillus* and that comprises bacteria belonging to *Bifidobacterium*.
<8>
The human gut microbiota model described in <7>, in which the 9 or more species are bacteria each belonging to Firmicutes, Actinobacteria, or Bacteriodetes, and comprises bacteria belonging to *Blautia, Collinsella*, or *Streptococcus*.
<9>
The human gut microbiota model described in <8>, comprising the bacteria belonging to Firmicutes at 56 to 59% as number of bacterial species, the bacteria belonging to Actinobacteria at 21 to 24% as number of bacterial species, and bacteria belonging to Bacteriodetes at 17 to 22% as number of bacterial species.
<10>
The human gut microbiota model described in any one of <7> to <9>, in which the at least 9 or more bacterial species are selected from the group consisting of *Blautia wexlerae, Bifidobacterium longum, Bifidobacterium pseudocatenulatum, Eubacterium rectale, Bifidobacterium adolescentis, Collinsella aerofaciens, Bacteroides uniformis, Dorea longicatena, Bacteroides vulgatus, Ruminococcus gnavus, Faecalibacterium prausnitzii, Parabacteroides distasonis, Dorea formicigenerans, Ruminococcus obeum, Ruminococcus torques, Bacteroides dorei, Flavonifractor plautii, Parabacteroides merdae, Roseburia inulinivorans, Clostridium nexile, Streptococcus salivarius, Eggerthella lenta, Clostridium bolteae, Roseburia intestinalis, Coprococcus comes, Bacteroides ovatus, Eubacterium hallii, Roseburia hominis*, and *Bacteroides* thetaiotaomicron.
<11>
The human gut microbiota model described in any one of <7> to <10>, in which the at least 9 or more bacterial species are *Blautia wexlerae, Bifidobacterium longum, Bifidobacterium pseudocatenulatum, Eubacterium rectale, Bifidobacterium adolescentis, Collinsella aerofaciens, Bacteroides uniformis, Dorea longicatena, Bacteroides vulgatus, Ruminococcus gnavus, Faecalibacterium prausnitzii, Blautia obeum, Bacteroides doret, Flavonifractor plautii, Streptococcus salivarius, Clostridium bolteae*, and *Coprococcus comes*.
<12>
A culture method for a human gut microbiota model to evaluate a short-chain fatty acids increase promoting action and/or a diversity increase promoting action in a human intestine of a target food composition, the culture method comprising the steps of
(1) adding at least 9 or more bacterial species that comprises no bacterium belonging to Proteobacteria and *Lactobacillus* and that comprises bacteria belonging to *Bifidobacterium*, to a modified GAM bouillon culture medium, and
(2) culturing the bacteria under an anaerobic condition.
<13>
A method for evaluating a short-chain fatty acids increase promoting action and/or a diversity increase promoting action in a human intestine of a target food composition, the method comprising the steps of
(1) adding a food composition to be evaluated to the human gut microbiota model described in any one of <7> to <11> to be cultured,
(2) measuring a short-chain fatty acids production amount of a culture acquired in (1) and/or calculating a diversity index thereof, and
(3) evaluating the short-chain fatty acids increase promoting action and/or the diversity increase promoting action to be present in a case where relative values of a measurement value and/or a calculated value in (2) are each a 1.0-fold value or greater compared to a case where the food composition is not added.

<14>
A method for producing a food and drink for improving gut microbiota, wherein a food is produced using the food composition that is evaluated to have the short-chain fatty acids increase promoting action and/or a diversity increase promoting action in the method for evaluating described in <13>.

<15>
A strain belonging to *Lactobacillus mucosae*, wherein the strain is selected from the group consisting of SBT10028 strain (NITE BP-03275), SBT10217 strain (NITE P-03276), SBT10027 strain (NITE P-03274), SBT10038 strain (NITE P-03283), SBT2261 strain (NITE P-03272), SBT2027 strain (NITE P-03271), SBT2271 strain (NITE P-03273), SBT2025 (NITE P-03189), SBT2269 (NITE P-03191), SBT2867 (NITE P-03192), SBT2268 (NITE P-03190), SBT10043 (NITE BP-03187), and SBT10228 (NITE P-03188).

Another present invention is to solve the above other problems. It has been found out for the first time that *Lactobacillus mucosae* has a proliferation promoting action for bifidobacteria and it has been confirmed that *Lactobacillus mucosae* is applicable to uses as a bifidobacteria proliferation promoting drug, and a food and drink for promoting the proliferation and to an increasing drug for the bifidobacteria rate in the human intestine, and a food and drink for the increase, and the present invention has been completed as a new probiotic.

The present invention further includes the following configurations.

<16>
An increasing drug for a rate of bifidobacteria in a human intestine, the increasing drug comprising *Lactobacillus mucosae* as an active ingredient thereof.

<17>
A bifidobacteria proliferation promoting drug comprising *Lactobacillus mucosae* as an active ingredient thereof.

[18]
The drug described in <16> or <17>, wherein a strain of *Lactobacillus mucosae* is a strain that has a 1.1-fold or more proliferation activity when the strain is cultured with bifidobacteria, compared to a case where the strain is not added.

<19>
The drug described in any one of <16> to <18>, wherein the strain(s) of *Lactobacillus mucosae* is/are one or more lactic acid bacterium strain(s) selected from the group consisting of SBT2025 (NITE P-03189), SBT2268 (NITE P-03190), SBT2269 (NITE P-03191), SBT2867 (NITE P-03192), SBT10043 (NITE BP-03187), and SBT10228 (NITE P-03188).

<20>
A food and drink for increasing a rate of bifidobacteria in a human intestine, comprising *Lactobacillus mucosae* as an active ingredient thereof.

<21>
A food and drink for promoting proliferation of bifidobacteria, comprising *Lactobacillus mucosae* as an active ingredient thereof.

<22>
The food and drink described in <20> or <21>, wherein a strain of *Lactobacillus mucosae* is a strain that has a 1.1-fold or more proliferation activity when the strain is cultured with bifidobacteria, compared to a case where the strain is not added.

<23>
The food and drink described in any one of <20> to <22>, wherein the strain(s) of *Lactobacillus mucosae* is/are one or more lactic acid bacterium strain(s) selected from the group consisting of SBT2025 (NITE P-03189), SBT2268 (NITE P-03190), SBT2269 (NITE P-03191), SBT2867 (NITE P-03192), SBT10043 (NITE BP-03187), and SBT10228 (NITE P-03188).

<24>
A producing method for a fermented milk product, the method comprising a step of culturing *Lactobacillus mucosae* on a culture medium that comprises milk as a main component thereof, wherein a strain having such properties is used as *Lactobacillus mucosae*, as that the strain is cultured together with bifidobacteria, the strain has a 1.1-fold or more proliferation activity, compared to a case where the strain is not added.

<25>
The producing method described in <24>, wherein the strain(s) of *Lactobacillus mucosae* is/are one or more lactic acid bacterium strain(s) selected from the group consisting of SBT2025 (NITE P-03189), SBT2268 (NITE P-03190), SBT2269 (NITE P-03191), SBT2867 (NITE P-03192), SBT10043 (NITE BP-03187), and SBT10228 (NITE P-03188).

The present invention further has the following configurations.

<26>
A method for improving a gut microbiota, comprising the step of administering a bacterial cell or a culture of *Lactobacillus mucosae* to a subject.

<27>
A method for promoting an increase of short-chain fatty acids, comprising the step of administering a bacterial cell or a culture of *Lactobacillus mucosae* to a subject.

<28>
A method for increasing diversity of gut bacteria comprising the step of administering a bacterial cell or a culture of *Lactobacillus mucosae* to a subject.

<29>
A method for increasing a rate of bifidobacteria in a human intestine comprising the step of administering a bacterial cell or a culture of *Lactobacillus mucosae* to a subject.

<30>
A method for promoting proliferation of bifidobacteria comprising the step of administering a bacterial cell or a culture of *Lactobacillus mucosae* to a subject.

Advantageous Effects of Invention

The model evaluation system for gut microbiota of Japanese of the present invention is constituted by the gut bacteria dominantly present in the intestines of Japanese, maintains the taxonomic rate of the gut bacteria constituting the gut microbiota of Japanese, and includes the gut bacteria a that present high abundance rates compared to those of foreigners, as the feature of the gut microbiota of Japanese, and can therefore evaluate an intestinal environment improving function of each of various food compositions by using this model evaluation system.

The present invention has enabled screening of food compositions that each improve the gut microbiota under the condition where no human and no animal are used and no human feces that are a biological sample are used.

It can be expected that the diversity of the gut bacteria constituting the gut microbiota is increased and the short-chain fatty acids in the gut microbiota are increased and, in addition, it can also be expected that the symptoms such as metabolic disorders and obesity associated with the above are improved, by ingesting the composition for improving the gut microbiota, including *Lactobacillus mucosae*, as an active ingredient thereof, that has been found out by the present invention.

Another present invention provides the fermented milk product including *Lactobacillus mucosae* that has the proliferation promoting activity for bifidobacteria, as an active ingredient thereof. The rate of bifidobacteria in the human intestine can be increased by ingesting the fermented milk product of *Lactobacillus mucosae*. According to the present invention, a new probiotic can therefore be provided.

DESCRIPTION OF EMBODIMENTS (*Lactobacillus mucosae*)

*Lactobacillus mucosae* of the present invention means the bacterium belonging to *Lactobacillus mucosae*. *Lactobacillus mucosae* of the present invention refers to a strain that has the base sequence homology of a 16S ribosomal RNA gene of 97% or higher, more preferably 98% or higher, and further preferably 99% or higher with that of a *Lactobacillus mucosae* type strain JCM 12515. The isolation source thereof may be any source and is, more preferably, a human.

The strain of *Lactobacillus mucosae* that is an active ingredient of a composition for improving the gut microbiota, and a food and drink therefor of the present invention may be any strain only when the strain increases the diversity of the gut bacteria constituting the gut microbiota and increases the short-chain fatty acids in the gut microbiota. Examples of the strain include, for example, SBT10028, SBT10043, SBT10217, SBT10027, SBT10038, SBT2261, SBT2027, and SBT2271 whose activities are indicated in Examples described later.

The strain of *Lactobacillus mucosae* that is an active ingredient of an increasing drug for the rate of bifidobacteria in the human intestine and a bifidobacteria proliferation promoting drug that are the other present invention may be any strain only when the strain has a bifidobacteria proliferation promoting activity, and examples thereof include, for example, SBT2025, SBT2268, SBT2269, SBT2867, SBT10043, and SBT10228 whose activities are indicated in Examples described later.

*Lactobacillus mucosae* that is an active ingredient of each of a composition for improving the gut microbiota in the human intestinal, a composition for promoting an increase of short-chain fatty acids or a composition for promoting an increase the diversity, and a food and drink for improving the gut microbiota, a food and drink for promoting an increase of short-chain fatty acids, and a food and drink for promoting an increase the diversity described herein, can be any *Lactobacillus mucosae* in a state to have a short-chain fatty acids increase promoting activity or a diversity increase promoting activity in the human intestine.

*Lactobacillus mucosae* that is an active ingredient of each of an increasing drug for the rate of bifidobacteria and a bifidobacteria proliferation promoting drug described herein, can be any *Lactobacillus mucosae* in the state to have the activity to increase the rate of bifidobacteria or promote the proliferation of bifidobacteria.

These are not limited to those each purely isolated as a bacterial cell, and may each be a culture, a suspended culture, or another substance including the bacterial cell. The bacterial cell may be a live cell or a dead strain and, among these, the live cell is suitable.

Examples of the live cell include a bacterial cell concentrate acquired by culturing and collecting the bacterial cell, a dried substance of the bacterial cell, and a freeze-dried substance thereof. Examples of the culture include a concentrate of a liquid culture, a dried substance, a freeze-dried substance, and, in addition, a fermented milk product of *Lactobacillus mucosae*. Examples of the fermented milk product include milk products such as a cheese, a fermented milk, a milk product, and a lactic acid bacteria drink, and are not especially limited.

The bacterial cell isolated from the acquired culture using a bacterial cell collecting means such as centrifugal separation can be used as it is as an active ingredient of the present invention.

*Lactobacillus mucosae* can be cultured in conformity with an ordinary method. Various types of culture medium are each usable as the culture medium therefor such as a milk medium or a culture medium including a milk component, and a semi-synthetic medium including no milk component. Examples of the above culture medium can include a reconstituted skim milk medium.

(Fermented Milk Product)

The "fermented milk product" as used herein refers to a product are those in which *Lactobacillus mucosae* is cultured in milk, or in a liquid or a sticky paste-like substance including a fat-free milk solid component equal to or more than that of milk. Milk only has to be raw milk, bovine milk, raw goat milk, raw ovine milk, or the like, and powdered skim milk may also be used after being reconstituted with water. As to the concentration of powdered skim milk to be used, the concentration is not limited only when the concentration is a concentration with which the fat-free milk solid is equal to or more than that of milk and with which *Lactobacillus mucosae* can be cultured while it is desirable that the concentration is 8% (w/w) or higher, preferably 9% (w/w) or higher, and more preferably 10% (w/w) or higher.

(Component Other than Powdered Skim Milk)

The fermented milk product may include a nutritional element other than powdered skim milk, and it is desirable in the case where a yeast extract is added that the concentration thereof be 0.1% (w/w) or higher, preferably 0.2% (w/w) or higher, and more preferably 0.5% (w/w) or higher. Examples of another nutritional element include sugar, an amino acid, a mineral, and a vitamin. The fermented milk product of the present invention may include a bacterium other than *Lactobacillus mucosae*. The fermented milk product can also include, for example, a lactic acid bacterium that is generally used as the fermentation starter of a fermented milk such as, for example, *Lactobacillus delbrueckii* subsp. *bulgaricus* and *Streptococcus thermophilus*.

*Lactobacillus mucosae* that is an active ingredient of each of the increasing drug for the rate of bifidobacteria and the bifidobacteria proliferation promoting drug can also be provided as a mixed culture (such as, for example, a fermented milk product) with bifidobacteria whose proliferation is promoted, by being cultured with bifidobacteria mixed therein.

(Live Cell Number of *Lactobacillus mucosae* of Fermented Milk Product)

It is desirable that *Lactobacillus mucosae* in the fermented milk product be included therein as live cell. The "live cell" as used herein refers to formation of a colony on a solid culture medium produced by causing a support medium such as agar to include nutritional elements (colony forming), and the "live cell number" is expressed in a colony forming unit (cfu). Examples of the solid culture medium to measure the live cell number of *Lactobacillus mucosae* thereon include an MRS agar medium that is a culture medium for lactic acid bacteria, and an LBS agar medium that is a culture medium for Lactobacilli. The live cell number of *Lactobacillus mucosae* in the fermented milk product is preferably 1.0E+06 cfu/mL or greater, further preferably 1.0E+07 cfu/mL or greater, and most preferably 1.0E+08 cfu/mL or greater.

(Short-Chain Fatty Acids Increase Promoting Activity)

The "short-chain fatty acids increase promoting activity" as used herein refers to promotion of an increase of the short-chain fatty acids in the human intestine. As to the increase promoting activity for the short-chain fatty acids, when the case where the composition for a food is added and the case where the composition is not added are compared with each other in a gut microbiota model having the feature of the gut microbiota of Japanese, it is stated that the activity is present in the case where an increase of the short-chain fatty acids is more conspicuous in the case where the composition is added. Assuming that the short-chain fatty acids concentration acquired in the case where culture is conducted in, for example, a gut microbiota model described later without adding any bacteria such as lactic acid bacteria and bifidobacteria, and indigestible dietary fibers is a 1.0-fold concentration, it is stated that the activity is present, in the case where the short-chain fatty acids concentration acquired in the case where bacteria such as lactic acid bacteria and bifidobacteria, and indigestible dietary fibers are added, is higher than the 1.0-fold concentration. The food composition having the activity is referred to as "composition for promoting an increase of the short-chain fatty acids" in the present invention. Assuming that the short-chain fatty acids concentration acquired in the case where culture is conducted without adding *Lactobacillus mucosae* is a 1.0-fold concentration, as to *Lactobacillus mucosae* to be used as an active ingredient of the composition for promoting an increase of the short-chain fatty acids of the present invention, the strain thereof presents preferably a 1.1-fold concentration or higher, more preferably a 1.5-fold concentration or higher, and further more preferably a 2.0-fold concentration, as the short-chain fatty acids concentration acquired in the case where *Lactobacillus mucosae* is added. In Examples described later, it was confirmed that both of butyric acid and the total short-chain fatty acids each presented a concentration that was higher than 1.0-fold concentration in the case where *Lactobacillus mucosae* was added compared to the case where *Lactobacillus mucosae* was not added, for any of the *Lactobacillus mucosae* strains.

Examples of the short-chain fatty acid include acetic acid, butyric acid, propionic acid, or the total short-chain fatty acids that is the sum of the above acids, and it is preferred that, among these, butyric acid that is stated to indicate straight the variation of the intestinal environment be used as an evaluation target. It is known that, compared to acetic acid and propionic acid, butyric acid has a high proliferation activity for intestinal epithelia cells, and it has been reported that, with each of various disorders, butyric acid decreases in the gut bacteria and the gut bacteria producing butyric acid decrease. It has also been reported that, in a patient suffering from an inflammatory bowel disease such as ulcerous colitis, *Faecalibacterium prausnitzii* that represents the gut microbiota producing butyric acid decreases or increases associated with exacerbation or remission of the symptom.

(Diversity Increase Promoting Action)

The "diversity increase promotion" as used herein refers to promotion of increase of the diversity in the human gut microbiota. Shannon Index indicating the evenness of species in a community, Phylogenic diversity index based on taxonomic information into consideration, or the like is often used as an index indicating the diversity of the gut bacteria constituting the gut microbiota.

As to the increase promoting activity for diversity, when the case where the composition for a food is added and the case where the composition is not added are compared with each other in a gut microbiota model having the feature of the gut microbiota of Japanese, the activity is stated to be present in the case where the index indicating the diversity of the gut bacteria is greater in the case where the composition is added. For example, in gut microbiota model described later, assuming that an index representing the diversity acquired in the case where culture is conducted without adding any bacteria such as lactic acid bacteria and bifidobacteria, or any indigestible dietary fibers is a 1.0-fold index, the activity is stated to be present in the case where the index representing the diversity acquired in the case where bacteria such as lactic acid bacteria and bifidobacteria, or indigestible dietary fibers are added is greater than the 1.0-fold index. The composition having the activity is referred to as "composition for promoting an increase the diversity" in the present invention. Assuming that the index representing the diversity acquired in the case where culture is conducted without adding *Lactobacillus mucosae* is a 1.0-fold index, as to *Lactobacillus mucosae* to be used as an active ingredient of the composition for promoting the increase the diversity of the present invention, the strain thereof is a strain presenting preferably 1.1-fold index or higher, more preferably a 1.2-fold index or higher, and further more preferably a 1.3-fold index, as the index representing the diversity acquired in the case where *Lactobacillus mucosae* is added.

It is stated that the gut microbiota improving activity is present, in the case where either one of or both of the short-chain fatty acids increase promoting activity and the diversity increase promoting activity is/are present, The composition for promoting an increase of the short-chain fatty acids and the composition for promoting an increase the diversity are each therefore also a composition for improving the gut microbiota. Similarly, the food and drink for promoting an increase of the short-chain fatty acids, and a food and drink for promoting the increase the diversity are each therefore also a food and drink for improving the gut microbiota.

(Composition for Improving Gut Microbiota in Human Intestine, Composition for Promoting Increase of Short-Chain Fatty Acids Therein, and Composition for Promoting Increase Diversity Therein)

As above, the fermented culture itself of *Lactobacillus mucosae*, and the bacterial cell itself of *Lactobacillus mucosae* can each be used as an active ingredient of each of the composition for improving the gut microbiota in the human intestinal, the composition for promoting an increase of the short-chain fatty acids therein, and the composition for promoting the diversity increase therein, of the present invention. Examples of the fermented culture preferably include the above fermented milk product.

The composition for improving the gut microbiota, the composition for promoting an increase of the short-chain fatty acids, and the composition for promoting the diversity increase can each be further used by being prepared as a drug. For preparing as a drug, the drug can be prepared by as necessary mixing therewith a diluent base, a stabilizing agent, a flavoring substance, and the like that are permitted for the preparation. The dosage forms can each be taken such as a tablet drug, an encapsulated drug, a granule drug, a powdered drug, a dust drug, and a syrup drug. A medical drug and a supplement correspond to the above. Improvement of the gut microbiota is expected through the action of promoting an increase of the short-chain fatty acids in the human gut microbiota, and/or the action of promoting the diversity increase therein by orally ingesting the above.

(Food and Drink for Improving Gut Microbiota in Human Intestine, Food and Drink for Promoting Increase of Short-Chain Fatty Acids Therein, and Food and Drink for Promoting Increase Diversity Therein)

The fermented culture itself of *Lactobacillus mucosae*, and the bacterial cell itself of *Lactobacillus mucosae* can each be used as an active ingredient of each of the food and drink for improving the gut microbiota in the human intestinal, the food and drink for promoting an increase of the short-chain fatty acids therein, and the food and drink for promoting the diversity increase therein of the present invention. Examples of the fermented culture to be used as a food preferably include the above fermented milk product.

Food and drinks produced by blending the composition for improving the gut microbiota, the composition for promoting an increase of the short-chain fatty acids, and the composition for promoting the diversity increase into proper food and drinks can each also be used as the food and drink for improving the gut microbiota, the food and drink for promoting an increase of the short-chain fatty acids, and the food and drink for promoting the diversity increase. For the blending, the compositions may each be added to the raw material during the production procedure of each of the food and drink, may each be blended into the ingredients, or may each be blended into each of the food and drinks that are the finished products.

Examples of the food and drinks include a milk product such as a cheese, a fermented milk, a milk product lactic acid bacteria drink, a lactic acid bacterial drink, butter, or margarine, drink such as a milk drink, a fruit juice drink, or a soft drink, an egg processed product such as a jelly, a candy, a pudding, or mayonnaise, sweet stuff and bread such as a butter cake, various types of powdered milk, a baby and toddler food, and a nutritional composition while the food and drinks are not especially limited.

The food and drink for improving the gut microbiota, the food and drink for promoting an increase of the short-chain fatty acids, and the food and drink for promoting the diversity increase of the present invention can each be also used as each of a food with functional claims, a food for specified health use, a nutritionally functional food, and a beauty food.

Improvement of the gut microbiota is expected through the action of promoting an increase of the short-chain fatty acids in the human gut microbiota, and/or the action of promoting the diversity increase therein by ingesting each of the above food and drinks.

In the case where the composition for improving the gut microbiota in the human intestinal, the composition for promoting an increase of the short-chain fatty acids therein, the composition for promoting the diversity increase therein, the food and drink for improving the gut microbiota in the human intestinal, the food and drink for promoting an increase of the short-chain fatty acids therein, and the food and drink for promoting the diversity increase therein are produced each by blending thereinto the bacterial cell and/or the culture of *Lactobacillus mucosae*, the blending rate is not especially limited and only has to be regulated as necessary to match with the easiness of the produce and a preferred dose per day. The blending rate is determined for each of those to be administered taking into consideration the symptom, the age, and the like of each thereof and, for an ordinary adult, the blending amount and the like only have to be adjusted such that 10 to 200 g of the culture of *Lactobacillus mucosae*, or 0.1 to 100 mg of the bacterial cell itself thereof can be ingested.

(Gut Microbiota Model)

The gut microbiota model of the present invention is a bacterial cell mixed culture that models the average gut microbiota of Japanese, and is a bacterial cell mixed culture characterized in that this model does not include the bacteria belonging to Proteobacteria and *Lactobacillus*, and includes the bacteria of at least 9 or more bacterial species including the bacteria belonging to *Bifidobacterium*. As to the bacteria included in the average gut microbiota of Japanese, it is desirable that the gut microbiota include the bacteria belonging to Firmicutes, Actinobacteria, and *Bacteroides*, and further include the bacteria belonging to *Blautia, Collinsella*, and *Streptococcus* as its feature. The numbers of the bacterial species of the gut bacteria belonging to Firmicutes, Actinobacteria, and *Bacteroides* respectively account for desirably 56 to 59%, 21 to 24%, and 17 to 22% to be included as a combination, as the composition rates. The numbers thereof account for more desirably about 57%, about 24%, and about 19%.

It is further desirable that the gut bacteria belonging to Firmicutes, Actinobacteria, and *Bacteroides* be included respectively at 56 to 59%, 21 to 24%, and 17 to 22% as a combination and *Blautia, Collinsella*, and *Streptococcus* be also included.

The "bacterial species" as used herein means the "species" of a bacterium. The systematic taxonomic classifications for a bacterium are referred to as in descending order "family", "genus", "species", and "strain", and the "bacterial species" means the species of these.

The bacteria of the at least 9 or more bacterial species only have be any 9 or more bacterial species selected from *Blautia wexlerae, Bifidobacterium longum, Bifidobacterium pseudocatenulatum, Eubacterium rectale, Bifidobacterium adolescentis, Collinsella aerofaciens, Bacteroides uniformis, Dorea longicatena, Bacteroides vulgatus, Ruminococcus gnavus, Faecalibacterium prausnitzii, Parabacteroides distasonis, Dorea formicigenerans, Ruminococcus obeum, Ruminococcus torques, Bacteroides dorei, Flavonifractor plautii, Parabacteroides merdae, Roseburia inulinivorans, Clostridium nexile, Streptococcus salivarius, Eggerthella lenta, Clostridium bolteae, Roseburia intestinalis, Coprococcus comes, Bacteroides ovatus, Eubacterium hallii, Roseburia hominis*, and *Bacteroides thetaiotaomicron* (29 species in total), only have to be more preferably any 9 or more bacterial species selected from *Blautia wexlerae, Bifidobacterium longum, Bifidobacterium pseudocatenulatum, Eubacterium rectale, Bifidobacterium adolescentis, Collinsella aerofaciens, Bacteroides uniformis, Dorea longicatena, Bacteroides vulgatus, Ruminococcus gnavus, Faecalibacterium prausnitzii, Blautia obeum, Bacteroides doret, Flavonifractor plautii, Streptococcus salivarius, Clostridium bolteae*, and *Coprococcus comes*, (17 species in total), and only have to be further preferably a mixed culture including these 17 species, and a mixed culture most preferably consists of these 17 species.

As to the bacteria, the 29 species were acquired that are available from RIKEN Bioresource Research Center (JCM) that are domestic culture collections, of the 50 species of the gut bacteria that are majority present in the gut microbiota of Japanese, and a combination was created by extracting plural gut bacteria such that the combination had the feature of the gut microbiota of Japanese, from the strains whose proliferation was confirmed by being cultured.

(Culture Method)

The culturing of the bacterial cell mixture that is the gut microbiota model only has to be conducted under the condition for the plural gut bacteria constituting the bacterial cell mixture to be able to grow under a single condition, and the examples of the culture medium include a YCFA culture medium (JCM culture medium No. 1130) and an EG culture medium (JCM culture medium No. 14), and also include a GAM bouillon and a modified GAM bouillon whose preparation is easier than the above. It is preferred that, among these, the modified GAM bouillon culture medium be used. Examples of the culture temperature include 36 to 38° C. as the temperature around the human body temperature, and it is preferred that 37° C. be employed. It is known that pH of the intestine differs depending on its region (the transverse colon, the distal colon, and the rectum), and pH thereof varies by production of the short-chain fatty acids or absorption of the short-chain fatty acids by the host. It is preferred based on this that pH of the culture medium before culturing be 6 or higher, and, within this, pH thereof is preferably 7 or higher and further preferably about 7.2. The intestine is in an oxygen-free condition and the gut bacteria colonized there are obligate anaerobes. It is therefore necessary to maintain the inside of the culture medium and the inside of the culture medium air layer to be in an oxygen-free condition using a nitrogen gas. A carbon dioxide gas and a hydrogen gas produced by the gut bacteria are also present in the intestine, and it is therefore preferred that these gases be included. Examples of the rates thereof include 80 to 90% for nitrogen, 5 to 10% for the carbon dioxide gas, and 5 to 10% for the hydrogen gas. It is preferred as to the culture time that the culture be conducted until pH of the culture medium becomes constant. The culture time is preferably 16 to 32 hours and further preferably 16 hours.

The various species of gut bacteria constituting the bacterial cell mixture are added such that about 1.0E+07 to about 1.0E+08 cfu/mL thereof is added to 100 mL of the culture medium. The bacterial number composition ratio of the various species of the gut bacteria in the overall bacterial cell mixture can be calculated by having a complete set of each number of all species of the bacteria to be added.

(Method for Evaluating Short-Chain Fatty Acids Increase Promoting Activity)

As to the method for evaluating the short-chain fatty acids increase promoting activity of the present invention, the evaluation can be conducted by adding the evaluation target to the bacterial cell mixture as the gut microbiota model and culturing by the above culture method, measuring the amount of the short-chain fatty acids after a specific period, and comparing the measurement result with that of the case where the evaluation target is not added. The measurement can be conducted by, for example, applying HPLC or the like to the culture supernatant fluid.

(Method for Evaluating Diversity Increase Promoting Activity)

As to the method for evaluating the diversity increase promoting activity of the present invention, the evaluation can be conducted by adding the evaluation target to the bacterial cell mixture as the gut microbiota model and culturing by the above culture method, measuring the index indicating the diversity after a specific period, and comparing the measurement result with that of the case where the evaluation target is not added. The measurement can be conducted by calculating the index indicating the diversity (quantify of the diversity) using a next-generation sequencer and an analysis pipeline from the genomic DNA extracted from the culture supernatant fluid.

(Screening Method)

As to the screening method of the present invention, the screening target is added to the bacteria mixture as the gut microbiota model and culturing by the above culture method, and the bacteria having the short-chain fatty acids increase promoting activity or the diversity increase promoting activity can be selected after a specific period.

A method of ingesting the lactic acid bacteria and the bifidobacteria that work on the gut bacteria constituting the gut microbiota and that thereby increase the short-chain fatty acids and increase the diversity can be considered as a method for increasing the diversity of the gut bacteria constituting the gut microbiota and increasing the short-chain fatty acids in the gut microbiota. The method is, for example, to ingest a fermented milk product including the bacteria. Examples of the representative species as lactic acid bacteria used in a fermented milk product include lactic acid bacteria belonging to *Lactobacillus*. Examples of the generally used species include *Lactobacillus delbrueckii* subsp. *bulgaricus, Lactobacillus gasseri, Lactobacillus reuteri*, and *Lactobacillus helveticas*. On the other hand, examples of the species not often used include *Lactobacillus mucosae*. This species is described as a bacterial species for which no concern over the safety is present in Qualified Presumption of Safety (QPS) of European Food Safety Authority (EFSA), and is drawing attention as a probiotic strain that achieves an effect of suppressing colonization of pathogenic bacteria and an effect of decreasing cholesterol. The lactic acid bacteria of the bacterial species belonging to *Lactobacillus* were screened using the screening method of the present invention, and it was found out for the first time that *Lactobacillus mucosae* had the short-chain fatty acid increase promoting action and the diversity increase promoting action.

As to this screening target, not only the bacteria such as lactic acid bacteria and bifidobacteria but also known food composition can each be used as the target. In Examples described later, indigestible dietary fibers α-cyclodextrin (CD) for which it was already known that this increased the short-chain fatty acids were evaluated (screened) using this screening method, and it was confirmed that the fibers increased the short-chain fatty acids and increased the diversity.

(Method for Producing Food and Drink for Improving Gut microbiota)

The method for producing a food and drink for improving the gut microbiota of the present invention is a method for producing a food using the food composition that is evaluated to have the short-chain fatty acids increase promoting action and/or the diversity increase promoting action using the above evaluation method or the screening method. The food and drink can be produced by blending the food composition of the present invention into a food and drink. For the blending, the food composition may be added to the raw material during the production procedure of the food and drink, may be blended into the ingredients, or may be blended into the food and drinks that are the finished products to be able to be produced. When the food composition of the present application is lactic acid bacteria or bifidobacteria, it can be produced by fermenting them to obtain a culture.

(Bifidobacteria)

The "bifidobacteria" as used herein means the bacteria belonging to *Bifidobacterium*. The bifidobacteria are not especially limited only when the bifidobacteria are the bacteria belonging to *Bifidobacterium* while examples thereof include *Bifidobacterium longum, Bifidobacterium*

*pseudocatenulatum*, *Bifidobacterium adolescentis*, *Bifidobacterium bifidum*, *Bifidobacterium breve*, and *Bifidobacterium dentium*. Among these, preferred examples include *Bifidobacterium longum*.

Examples of the strain thereof include *Bifidobacterium longum* type strain JCM 217 or *Bifidobacterium longum* SBT2928 strain (Accession Number: FERM P-10657, Date of Deposite: Apr. 13, 1989, National Institute of Advanced Industrial Science and Technology, Patent Microorganisms Depositary).

(Proliferation Promotion for Bifidobacteria)

The "promotion of proliferation of bifidobacteria" as used herein refers to an increase of the live cell number of bifidobacteria. As to the proliferation promoting activity for bifidobacteria, when the case where *Lactobacillus mucosae* is added and the case where *Lactobacillus mucosae* is not added are compared with each other, it is stated that the activity is present in the case where an increase of the live cell number is more conspicuous in the case where *Lactobacillus mucosae* is added. For example, assuming that the live cell number of bifidobacteria acquired in the case where bifidobacteria are cultured in vitro without adding *Lactobacillus mucosae* thereto is a 1.0-fold count, it is stated that the activity is present in the case where the live cell number of bifidobacteria acquired in the case where *Lactobacillus mucosae* is added is greater than the 1.0-fold count. A drug having the activity is referred to as "bifidobacteria proliferation promoting drug" in the present invention. As to *Lactobacillus mucosae* to be an active ingredient of the bifidobacteria proliferation promoting drug of the present invention, assuming that the live cell number of bifidobacteria acquired in the case where bifidobacteria are cultured without adding *Lactobacillus mucosae* thereto is a 1.0-fold count, the strain thereof is a strain presenting the live cell number of bifidobacteria acquired in the case where *Lactobacillus mucosae* is added, of preferably a 1.1-fold count or greater, more preferably a 1.5-fold count or greater, and further more preferably a 2.0-fold count or greater.

(Live Cell Number of Bifidobacteria)

The "live cell number of bifidobacteria" refers to the number of formed colonies observed on a GAM bouillon culture medium that is a culture medium for anaerobic bacteria on which bifidobacteria can grow, a TOS propionic acid agar culture medium that is a culture medium for bifidobacteria, or the like.

(Increase of Rate of Bifidobacteria in Human Intestine)

The "increase of the rate of bifidobacteria in the human intestine" as used herein refers to an increase of the rate of bifidobacteria in the human gut bacteria group. It is stated that the activity is present in the case, for example, where the rate of bifidobacteria in the gut bacteria after ingesting *Lactobacillus mucosae* is higher than a 1.0-fold rate compared to the rate thereof before ingesting *Lactobacillus mucosae*. The drug having the activity is referred to as "an increasing drug for rate of the bifidobacteria in the intestine" in the present invention. The strain of *Lactobacillus mucosae* to be an active ingredient of the increasing drug for the rate of bifidobacteria in the intestine of the present invention is a strain that presents the rate after ingesting compared to the rate before ingesting, of preferably a 1.1-fold rate or higher, more preferably a 1.3-fold rate or higher, yet more preferably a 2.0-fold rate or higher, and further preferably a 3.0-fold rate or higher.

Examples of the screening method for this strain include a method of screening the strain that presents the live cell number of bifidobacteria is acquired in the case where bifidobacteria are cultured with adding *Lactobacillus mucosae* is a 1.1-fold rate or higher count when it is assuming that the live cell number of bifidobacteria is acquired in the case where bifidobacteria are cultured in vitro without adding *Lactobacillus mucosae* thereto under culture conditions that imitate the intestinal environment is a 1.0-fold count.

(Rate of Bifidobacteria)

The "rate of bifidobacteria in the human intestine" means the rate of bifidobacteria in the DNA in feces. For the DNA acquired from feces, a 16S rRNA gene is amplified using a PCR and the rate of DNA of bifidobacteria origin included in the overall PCR product can thereby be calculated. For the Quantification of the rate, such bacterial flora analysis methods are usable as a meta analysis (16S rRNA) method using a next-generation sequencer or a terminal restriction fragment length polymorphism (T-RFLP) method.

(Increasing Drug for Bifidobacteria Rate in Human Intestine and Bifidobacteria Proliferation Promoting Drug)

For an increasing drug for the bifidobacteria rate in the human intestine and a bifidobacteria proliferation promoting drug of the present invention, the fermented culture itself of *Lactobacillus mucosae* and the bacterial cell itself thereof can be used. Example of the fermented culture used as a food include the above fermented milk products.

Those further prepared as drugs can be used. For preparing as a drug, the drug can be prepared by as necessary mixing the fermented culture or the bacterial cell with a diluent base, a stabilizing agent, a flavoring substance, and the like that are permitted for the preparation to be concentrated, or freeze-dried, and a dead strain may also be used that is acquired by heat-drying the mixture. A dried substance, a concentrated substance, or a paste-like substance of the above is included.

The drug can also be prepared by mixing a diluent base, a binder, a disintegrating agent, a lubricant, a flavoring agent, a suspension agent, a coating agent, and other optional agents, each within the range that does not obstruct the bifidobacteria proliferation promoting activity. Such dosage forms can be taken as a tablet drug, an encapsulated drug, a granule drug, a powdered drug, a dust drug, and a syrup drug, and it is preferred that these be orally administered.

(Food and Drink for Increasing Bifidobacteria Rate in Human Intestine, and Food and Drink for Promoting Bifidobacteria Proliferation)

A food and drink for increasing the bifidobacteria rate in the human intestine, and a food and drink for promoting bifidobacteria proliferation of the present invention can each use a fermented culture itself of *Lactobacillus mucosae*. Examples of the fermented culture to be used as a food include the above fermented milk products.

As to the food and the drinks, food and drinks produced by blending the increasing drug for the bifidobacteria rate in the human intestine and the bifidobacteria proliferation promoting drug into a proper food and drink can each also be used. These may be blended in the raw material during the production procedure of each of the food and drink, may be blended into the ingredients, or may be blended into each of the food and drinks that are the finished products.

Examples of the food and drinks include a milk product such as a cheese, a fermented milk, a milk product lactic acid bacteria drink, a lactic acid bacterial drink, butter, or margarine, drink such as a milk drink, a fruit juice drink, or a soft drink, an egg processed product such as a jelly, a candy, a pudding, or mayonnaise, sweet stuff and bread such as a butter cake, various types of powdered milk, and in addition, a baby and toddler food and a nutritional composition, while the food and drinks are not especially limited.

The food and drink for increasing the bifidobacteria rate in the human intestine, and the food and drink for promoting bifidobacteria proliferation of the present invention can each be also used as each of a food with functional claims, a food for specified health use, a nutritionally functional food, and a beauty food.

In the case where the increasing drug for the rate of bifidobacteria in the human intestine, the bifidobacteria proliferation promoting drug, the food and drink for increasing the rate of bifidobacteria in the human intestine, the food and drink for promoting proliferation of bifidobacteria, the nutritional composition for increasing the bifidobacteria rate in the human intestine, and the bifidobacteria proliferation promoting drug nutritional composition are produced each by blending the bacterial cell and/or the culture of *Lactobacillus mucosae*, the blending rate is not especially limited and only has to be regulated as necessary to match with the easiness of the produce and a preferred dose per day. The blending rate is determined for each of those to be administered taking into consideration the symptom, the age, and the like of each thereof and, for an ordinary adult, the blending amount and the like only have to be adjusted such that 10 to 200 g of the culture of *Lactobacillus mucosae*, or 0.1 to 100 mg of the bacterial cell itself thereof can be ingested.

Examples of the present invention will be described below in detail and the present invention is not limited thereto.

EXAMPLES

[Test Example 1] Preparation of Culture for Model Evaluation System

1. Extraction of Gut Bacteria Having Feature of Gut Microbiota of Japanese (1) Acquisition and Selection of Gut Bacteria The available bacterial species of the gut bacteria majority present in the gut microbiota of Japanese were acquired from RIKEN Bioresource Research Center (JCM) that are domestic culture collections, and were cultured each on a modified GAM bouillon culture medium (Merchandise code: 05433 from Nissui Pharmaceutical Co., Ltd.). From the 29 species of gut bacteria for which proliferation was recognized in the culturing, the gut bacteria were extracted in the combination that maintained the taxonomic rate in the intestines of Japanese. The combination was set to include the gut bacteria belonging to Firmicutes, Actinobacteria, and *Bacteroides* respectively at about 57%, about 24%, and about 19% as the number of the bacterial species. The gut bacteria were extracted in the combination that maintained the above rates and that included *Blautia*, *Bifidobacterium*, *Collinsella*, and *Streptococcus* that were the bacterial genera presenting the high abundance rates for Japanese compared to those of foreigners.

(2) Preparation of Concentrated Bacterial Cell of Each Species

A modified GAM bouillon culture medium was prepared and the culture medium was sterilized in heating treatment at 121° C. for 15 minutes. The above 29 bacterial species of gut bacteria were each inoculated on the sterilized culture medium, and were anaerobically cultured at 37° C. using an anaerobic work station (Concept 400, Central Science Trading Co., Ltd.). The acquired cultures were each concentrated by an centrifugal operation and glycerol was added to each of the concentrated cultures to be included at 10% (v/v) to acquire a concentrated bacterial cell of each of the species. These concentrated bacterial cells were frozen at −80° C. and were thereafter melted to thereafter be diluted in stages. The diluted cultures were each spread onto a modified GAM bouillon agar culture medium to measure the live cell number. It was thereby confirmed that the live cell number of 1.0E+07 cfu/mL or greater was included for each of all the strains. Table 1 below shows the composition of the used modified GAM bouillon culture medium.

TABLE 1

| Component | In 1 L |
|---|---|
| Peptone | 5.0 g |
| Soy Peptone | 3.0 g |
| Proteose Peptone | 5.0 g |
| Digestive Serum Powder | 10.0 g |
| Yeast Extract | 2.5 g |
| Meat Extract | 2.2 g |
| Liver Extract | 1.2 g |
| Glucose | 0.5 g |
| Soluble Starch | 5.0 g |
| L-tryptophan | 0.2 g |
| L-cysteine Hydrochloride Salt | 0.3 g |
| Sodium Thioglycolate | 0.3 g |
| L-Arginine | 1.0 g |
| Vitamin K1 | 5.0 mg |
| Hemin | 10.0 mg |
| Potassium Dihydrogen Phosphate | 2.5 g |
| Sodium Chloride | 3.0 g |

2. Test Result

In conformity with the idea in the above 1(1), the gut bacteria were extracted to set a community of 9 species in total that included 5 species, 2 species, and 2 species of the gut bacteria respectively belonging to Firmicutes, Actinobacteria, and *Bacteroides*, a community of 12 species in total that included 7 species, 3 species, and 2 species of the intestinal bacterium respectively belonging thereto, a community of 14 species in total that included 8 species, 3 species, and 3 species of the gut bacteria respectively belonging thereto, and a community of 17 species in total that included 10 species, 4 species, and 3 species of the gut bacteria respectively belonging thereto. Table 2 shows the community of 17 species that included all the 4 species belong to Actinobacteria that were included in the acquired 29 species.

TABLE 2

| Bacterial species | Name of Bacterial species | JCM strain Number | Classification by Phylum |
|---|---|---|---|
| 1 | *Streptococcus salivarius* | 5707T | Firmicutes |
| 2 | *Ruminococcus gnavus* | 6515T | Firmicutes |
| 3 | *Blautia wexlerae* | 17041T | Firmicutes |
| 4 | *Dorea langicatena* | 11232T | Firmicutes |
| 5 | *Clostridium bolteae* | 12243T | Firmicutes |
| 6 | *Eubacterium rectale* | 17463T | Firmicutes |
| 7 | *Coprococcus comes* | 31264 | Firmicutes |
| 8 | *Blautia obeum* | 31340 | Firmicutes |
| 9 | *Faecalibacterium prausnitzii,* | 31915 | Firmicutes |
| 10 | *Flavonifractor plautii* | 32125T | Firmicutes |
| 11 | *Bifidobacterium pseudocatenulatum* | 1200T | Actinobacteria |
| 12 | *Bifidobacterium longum* | 1217T | Actinobacteria |
| 13 | *Bifidobacterium adolescentis* | 1275T | Actinobacteria |
| 14 | *Collinsella aerofaciens* | 10188T | Actinobacteria |
| 15 | *Bacteroides vulgatus* | 5826T | Bacteroides |
| 16 | *Bacteroides uniformis* | 5828T | Bacteroides |
| 17 | *Bacteroides uniformis* | 13471T | Bacteroides |

3. Culture Method for Model Evaluation System

A sterilized modified GAM bouillon culture medium was added to a small-capacity culture apparatus whose temperature and pH can be monitored over time, and the dissolved oxygen in the culture medium was removed as much as possible by aerating in the culture apparatus using a mixture gas of nitrogen, carbon dioxide, and hydrogen for a specific time before culturing. For example, the aeration was conducted using a small-capacity multiple culture apparatus (Bio Jr. 8 from ABLE Corporation) whose packings made from a silicone material were changed to those made from a nitryl (NBR) material and whose tubes were changed to PharMed tubes, with the mixture gas that had the rates of 80% for nitrogen, 10% for carbon dioxide, and 10% for hydrogen.

A reconstructed mixed culture of the bacteria of 17 species shown in Table 2 was inoculated, the aeration was conducted using the above mixture gas, and culture was conducted being stirred until pH of the culture medium became constant. As to the mixed culture of the model evaluation system, each of the gut bacteria was about 1.0E+07 to about 1.0E+08 cfu/mL relative to 100 mL of the culture medium. The stirring was at 100 rpm or lower, pH at the start of the culturing was 7.2, and the culture time was 16 hours.

In the Test Examples below, a candidate composition for a food was added to the model evaluation system and a culture acquired when the culture was conducted using the above culture method was collected. The short-chain fatty acids were measured and the index indicating the diversity was calculated to be evaluated.

[Test Example 2] Establishment of Evaluation Method for Increase Promoting Activity for Short-Chain Fatty Acids and Increase Promoting Activity for Diversity It is widely known that the short-chain fatty acids in the gut microbiota increase by ingesting indigestible dietary fibers in the human while no food composition that stably increases the diversity has been reported so far. Not only a decrease of the short-chain fatty acids but also reduction of the diversity have however been reported for the patients each suffering from obesity, diabetes, or hyperlipidemia, and it is presumed that the short-chain fatty acids and the diversity have a level of relation with each other.

This evaluation system uses the standardized gut microbiota model, and the increase promoting action for the diversity, whose comparison has been difficult due to the difference in the gut microbiota among individuals can therefore be highly precisely checked.

(1) Test Method

Indigestible dietary fibers, α-cyclodextrin (α-CD: CAVAMAX WG Food from CycloChem Co., Ltd.) for which it was confirmed that this increased the short-chain fatty acids were added to this evaluation system as the test target, and it was checked whether the short-chain fatty acids increased, and the diversity was also evaluated. The indigestive dietary fibers were added in an amount of 0.2% capable of being ingested by the human (assuming addition of 6 g thereof to a meal of 3,000 g).

(2) Evaluation Method for Short-Chain Fatty Acids Production Increase Promoting Action Quantification of the production amounts of butyric acid and the total short-chain fatty acids (the sum of acetic acid, propionic acid, and butyric acid) was conducted from the supernatant fluid of the culture using HPLC (ICS2100 from DIATECH CORPORATION), and the evaluation was conducted. The representative short-chain fatty acids produced by the gut bacteria in the human intestine are three that are acetic acid, propionic acid, and butyric acid.

(3) Evaluation Method for Diversity Increase Promoting Action

Quantification of the index (quantify of the diversity) was conducted using a next-generation sequencer (Ion PGM from Thermo Fisher Scientific K. K.) and an analysis pipeline (QIIME2) from the genomic DNA extracted from the supernatant fluid of the culture, and the evaluation was conducted.

Two indexes of Shannon Index and Phylogenetic diversity index were selected each as an index indication the diversity of the gut microbiota.

(4) Test Result

The increase rate of the short-chain fatty acids production amount in the case where the increase rate thereof in the control section to which no α-CD was added was set to be 1.0, was a 1.57-fold value for butyric acid, and the total short-chain fatty acids production (the sum of acetic acid, propionic acid, and butyric acid) also increased to a 1.13-fold value.

The increase rate of the diversity index in the case where 1.0 was set as the increase rate for non-addition, was a 1.25-fold value by Shannon Index and the Phylogenetic diversity index also increased to a 1.05-fold value.

From the above, in this evaluation method, an increase of the short-chain fatty acids was confirmed with excellent reproducibility due to the addition of α-CD. The increase of the diversity was also confirmed with excellent reproducibility. It was therefore demonstrated that this evaluation method was a highly precise evaluation method as the model evaluation system.

[Test Example 3] Screening of Lactic Acid Bacteria Increasing Short-Chain Fatty Acids and/or Increasing Diversity of Gut Microbiota (1) Test Method As to the lactic acid bacteria belonging to *Lactobacillus mucosae*, it was checked whether the short-chain fatty acids increased and the increase of the diversity was also evaluated, using the evaluation method demonstrated in Test Example 2. For example, the lactic acid bacteria (Table 2) belonging to *Lactobacillus mucosae* that were retained by the applicant and that were acquired from the human as the isolation source, were each added by an amount of about 1.0E+07 cfu/mL to a culture medium of 100 mL.

(2) Evaluation Method for Short-Chain Fatty Acids Production Increase Promoting Action The evaluation was conducted in the same manner as that of Test Example 2.

(3) Evaluation Method for Diversity Increase Promoting Action

The evaluation was conducted in the same manner as that of Test Example 2.

(4) Test Result

The various species of lactic acid bacteria and bifidobacteria that increased the short-chain fatty acids by the addition thereof in the model evaluation system were sought, and an increase of the short-chain fatty acids was confirmed with excellent reproducibility by addition of the *Lactobacillus mucosae* culture. The increase of the diversity was also confirmed with excellent reproducibility.

The increase rates of the short-chain fatty acids production amounts in the case where, for example, *Lactobacillus rhamnosus* and *Lactobacillus delbrueckii* subsp. *bulgaricus*, that were retained by the applicant and that were acquired from the human as the isolation source, were added, were respectively a 0.66-fold rate and a 0.85-fold rate for butyric acid, and were also decreased respectively to a 0.94-fold rate and a 0.95-fold rate for the total short-chain fatty acids production (the sum of acetic acid, propionic acid, and butyric acid). The increase rates of the diversity indexes were respectively a 0.97-fold rate and a 0.85-fold rate as the Shannon index and were also decreased respectively to a 0.95-fold rate and a 0.95-fold rate as the Phylogenetic diversity index.

Table 3 shows the increase rates of the short-chain fatty acids production amount in the case where the increase rate thereof of the control section to which *Lactobacillus mucosae* was not added was set to be 1.0, and Table 4 shows the increase rates of the diversity indexes in the same case.

TABLE 3

Increase Rates of Short-Chain Fatty Acids Production Amount by Addition of *Lactobacillus mucosae*

| Name of Bacterial Species | SBT Strain Number | Isolation Source | Butyric Acid | Total Short-Chain Fatty Acids |
|---|---|---|---|---|
| Lactobacillus mucosae | 10028 | Human | 2.33 | 1.13 |
| Lactobacillus mucosae | 10043 | Human | 1.87 | 1.22 |
| Lactobacillus mucosae | 10217 | Human | 1.74 | 1.15 |
| Lactobacillus mucosae | 10027 | Human | 1.56 | 1.12 |
| Lactobacillus mucosae | 10038 | Human | 1.47 | 1.08 |
| Lactobacillus mucosae | 2261 | Human | 1.41 | 1.10 |
| Lactobacillus mucosae | 2027 | Human | 1.34 | 1.07 |
| Lactobacillus mucosae | 2271 | Human | 1.18 | 1.11 |

TABLE 4

Increase Rates of Diversity Indexes by Addition of *Lactobacillus mucosae*

| Name of Bacterial species | SBT Strain Number | Isolation Source | Shannon index | Phytogenetic diversity index |
|---|---|---|---|---|
| Lactobacillus mucosae | 10028 | Human | 1.26 | 1.20 |
| Lactobacillus mucosae | 10043 | Human | 1.46 | 1.36 |
| Lactobacillus mucosae | 10217 | Human | 1.36 | 1.29 |
| Lactobacillus mucosae | 10027 | Human | 1.29 | 1.20 |
| Lactobacillus mucosae | 10038 | Human | 1.38 | 1.34 |
| Lactobacillus mucosae | 2261 | Human | 1.19 | 1.11 |
| Lactobacillus mucosae | 2027 | Human | 1.25 | 1.12 |
| Lactobacillus mucosae | 2271 | Human | 1.29 | 1.22 |

(5) Consideration

α-CD and *Lactobacillus mucosae* were added each as the food composition promoting the growth of the gut bacteria, to the gut microbiota model that was the mixed culture and that was reconstructed by the major gut microbiota of Japanese, to conduct mixed culturing, and it was thereby able to be confirmed that an increase of the short-chain fatty acids production amount and/or increase of the diversity were/was promoted when compared to the case without addition thereof.

[Test Example 4] Proliferation Promotion of Bifidobacteria (1) Strain

As to *Lactobacillus mucosae*, strains thereof acquired from the human as the isolation source in Table 5 were used. As to bifidobacteria, a type strain JCM 1217 of the same bacterial species as *Bifidobacterium longum* for which it was widely known that this bacterium is widely distributed from Japanese babies to Japanese elderly persons was used.

TABLE 5

| | Used Strain | |
|---|---|---|
| Name of Species | Strain Number | Isolation Source |
| Lactobacillus mucosae | SBT2025 | Human |
| Lactobacillus mucosae | SBT2268 | Human |
| Lactobacillus mucosae | SBT2269 | Human |
| Lactobacillus mucosae | SBT2867 | Human |
| Lactobacillus mucosae | SBT10043 | Human |
| Lactobacillus mucosae | SBT10228 | Human |

(2) Preparation of *Lactobacillus mucosae* Concentrated Bacterial Glycerol Stock An MRS liquid culture medium that was a culture medium for lactic acid bacteria was prepared and was sterilized in heating treatment at 121° C. for 15 minutes. *Lactobacillus mucosae* SBT2025, *Lactobacillus mucosae* SBT2268, *Lactobacillus mucosae* SBT2269, *Lactobacillus mucosae* SBT2867, *Lactobacillus mucosae* SBT10043, and *Lactobacillus mucosae* SBT10228 that are described in Table 5 were each inoculated on the prepared culture medium to be anaerobically cultured at 37° C. for 16 hours using an anaerobic culture system (Merchandise Name: AneroPack, Mitsubishi Gas Chemical Company, Inc.). The acquired culture was concentrated by a centrifugal separation, and glycerol was added to each of the concentrated cultures for the culture to be included at 10% (v/v) to acquire a concentrated bacterial cell. These concentrated bacterial glycerol stocks were frozen at −80° C. and were thereafter melted to thereafter be diluted in stages. The diluted cultures were each spread onto an MRS agar culture medium to measure the live cell number. It was confirmed that the live cell number of 2.0E+09 cfu/mL or greater was included for each of all the strains.

(3) Preparation of *Lactobacillus mucosae* Fermented Milk Product

10% (w/w)-powdered skim milk including yeast extract at 0.5% (w/w) and glucose at 2.5% (w/w) was prepared and was sterilized in heating treatment at 115° C. for 20 minutes. Each of the concentrated bacterial glycerol stocks prepared as above was added to the sterilized powdered skim milk to be included at 0.1% (v/w) to be anaerobically cultured at 37° C. for 16 hours using an anaerobic culture system. The acquired fermented milk products were each diluted in stages as the volume, and the diluted fermented milk products were each spread onto an LBS agar culture medium for Lactobacilli that included acetic acid at 0.132% (v/v) to measure the live cell number. It was confirmed for each of all the strains that the live cell number of 1.0E+06 cfu/mL or greater was included. These were used for mixed-culturing with *Bifidobacterium longum* JCM 1217.

(4) Preparation of Concentrated Bacterial Cell of *Bifidobacterium longum* JCM 1217

A GAM liquid culture medium (GAM Bouillon, Product Code: 05422, Manufactured by: Nissui Pharmaceutical Co., Ltd.) that was a culture medium for anaerobic bacteria was prepared and was sterilized in heating treatment at 115° C. for 15 minutes. *Bifidobacterium longum* JCM 1217 was inoculated on the sterilized culture medium to be anaerobically cultured at 37° C. for 16 hours using an anaerobic culture system. The acquired culture was concentrated by a centrifugal operation, and glycerol was added to the concentrated culture for the culture to be included at 10% (v/v)

to acquire a concentrated bacterial cell. These concentrated bacterial glycerol stocks were frozen at −80° C. and were thereafter melted to be thereafter diluted in stages. The diluted bacterial cells were each spread onto a TOS propionic acid agar culture medium for bifidobacteria to measure the live cell number. It was confirmed that the live cell number of 1.0E+09 cfu/mL was included. This was used for the mixed culturing with *Lactobacillus mucosae*.

(5) Mixed Culturing of *Lactobacillus mucosae* Fermented Milk Product with *Bifidobacterium longum* JCM 1217

A GAM liquid culture medium (GAM Bouillon, Product Code: 05422, Manufactured by: Nissui Pharmaceutical Co., Ltd.) that was a culture medium for anaerobic bacteria was prepared and was sterilized in heating treatment at 115° C. for 15 minutes. A 1% (v/v)-*Lactobacillus mucosae* fermented milk product (1.0E+06 cfu/mL or greater) and a 10% (v/v)-*Bifidobacterium longum* JCM 1217 concentrated bacterial cell (1.0E+09 cfu/mL) were added to the sterilized culture medium to be mixed with each other to be cultured at 37° C. for 16 hours using an anaerobic culture system. An experimental section having no *Lactobacillus mucosae* fermented milk product added thereto was provided as a control section. The GAM liquid culture medium was a culture medium used as a model culture medium of the intestinal environment (PLOSONE DOI: 10.1371/JOURNALPONE.0160533 Aug. 2, 2016).

(6) Bifidobacteria Live Cell Number and Proliferation Promotion after Mixed Culturing The above mixed culture was diluted in stages to have a 10-fold amount as the volume and was spread onto a TOS propionic acid agar culture medium including mupirocin lithium at 0.005% (w/v) that was a selective medium for bifidobacteria, to be cultured at 37° C. for three days using an anaerobic culture system. The number of colonies formed on the agar culture medium was observed and an increase of the number of the formed colonies (cfu) by each of the fermented milk products in the case where the increase thereof in the control section was set to be a 1.0-fold increase, that is, the proliferation promotion of bifidobacteria was calculated as a multiplying factor.

As a result, the live cell number of bifidobacteria in the control section to which no *Lactobacillus mucosae* fermented milk product was added was 4.7E+08 cfu/mL while that of the case of the addition of the SBT2025 fermented milk product was 8.7E+08 cfu/mL (1.8-fold proliferation promotion), that of the case of the addition of the SBT2268 fermented milk product was 1.0E+09 cfu/mL (2.1-fold proliferation promotion), that of the case of the addition of the SBT2269 fermented milk product was 1.0E+09 cfu/mL (2.1-fold proliferation promotion). And, that of the case of the addition of the SBT2867 fermented milk product was 1.3E+09 cfu/mL (2.9-fold proliferation promotion), that of the case of the addition of the SBT10043 fermented milk product was 5.1E+08 cfu/mL (1.1-fold proliferation promotion), and that of the case of the addition of the SBT10228 fermented milk product was 1.3E+09 cfu/mL (2.7-fold proliferation promotion). Therefore, these *Lactobacillus mucosae* fermented milk products each presented 1.1-fold or higher proliferation promotion for the proliferation promotion of bifidobacteria compared to that of the control section (Table 6). "E+08" and "E+09" respectively represent "×10$^8$" and "×10$^9$".

TABLE 6

Bifidobacteria Proliferation Promotion of *Lactobacillus mucosae* Fermented Milk Product

| Fermented Milk Product (Strain Number) | Bifidobacteria Viable Bacteria Count (cfu/mL) | Proliferation Promotion (-fold proliferation promotion) (1.0-fold proliferation promotion represents that of the case without the fermented milk product.) |
|---|---|---|
| None | 4.7E+08 | 1.0 |
| SBT2025 | 8.7E+08 | 1.8 |
| SBT2268 | 1.0E+09 | 2.1 |
| SBT2269 | 1.0E+09 | 2.1 |
| SBT2867 | 1.3E+09 | 2.9 |
| SBT10043 | 5.1E+08 | 1.1 |
| SBT10228 | 1.3E+09 | 2.7 |

(Test Example 5) Increase of Rate of Bifidobacteria in Human Intestine (1) Strain and Production of Fermented Milk Prototype With SBT10043 that presented 1.1-fold proliferation promotion in Test Example 4, an edible fermented milk product was produced as a prototype. SBT10043 was isolated as a single colony onto an MRS agar culture medium, and a portion thereof was thereafter scraped away therefrom to be anaerobically cultured on a nutritional culture medium that included a yeast extract at 1% (w/w), casein peptone at 2% (w/w), and glucose at 2% (w/w) as a food additive, at 37° C. for 16 hours using an anaerobic culture system. The culture was concentrated by a centrifugal to have a 10-fold concentration as the volume to acquire an edible concentrated bacterial glycerol stock. A 10% (w/w)-powdered skim milk including a yeast extract at 0.5% (w/w) and glucose at 2.5% (w/w) as a food additive was prepared and was sterilized at 115° C. for 20 minutes. The edible concentrated bacterial glycerol stock was added to the skim milk culture medium to be included at 10% (v/w), to be statically cultured at 37° C. for 24 hours in an airtight container.

The above fermented milk product was inoculated, to be included at 10% (w/w) thereof, onto a newly prepared and sterilized 10% (w/w)-powdered skim milk including a yeast extract at 0.5% (w/w) and glucose at 2.5% (w/w) as a food additive, to be statically cultured at 37° C. for 24 hours in an airtight container. This was produced as an edible fermented milk product. The edible fermented milk product was produced for plural times as necessary by repeating subculture using the same edible fermented milk product as the inoculum. The edible fermented milk product was inoculated, to be included at 10% (w/w) thereof, onto a same skim milk culture medium (10% (w/w)-powdered skim milk including an yeast extract at 0.5% (w/w) and glucose at 2.5% (w/w)) as a food additive, to be statically cultured at 37° C. for 24 hours in an airtight container and this subculture was repeated to thereby produce the inoculum of the edible fermented milk product, and the culture weight was increased as necessary, to be used to be ingest as the edible fermented milk product.

(2) Live Cell Number of SBT10043 in Edible Fermented Milk Product 1.0 mL of the edible fermented milk product was diluted in stages to have a 10-fold amount as the volume, and it was spread onto an LBS agar culture medium for Lactobacilli, that included acetic acid at 0.132% (v/v), and the live cell number thereof was measured. It was confirmed that a live cell number of 5.0E+08 cfu/mL or more was included.

(3) Ingestion Time Period and Ingesting Subject of Edible Fermented Milk Product The edible fermented milk product including SBT10043 was ingested for 14 days to have 200 mL per day, that is, 1.0E+09 cfu/day or more. The feces before and after the ingestion were collected and DNA was extracted therefrom to determine the rate of bifidobacteria using a T-RFLP method that was one of bacterial flora analysis methods. The persons to ingest were two that were an ingesting subject A whose bifidobacteria were less than 10% and an ingesting subject B whose bifidobacteria were 10% or higher, before the ingestion of the edible fermented milk product.

(4) Increase of Rate of Intestinal Bifidobacteria in Ingesting Subject A

The rate of bifidobacteria in the intestine of the ingesting subject A before the ingestion of the edible fermented milk product including *Lactobacillus mucosae* was 3.3% while, after the ingestion of the fermented milk product for 14 days, the rate was increased to 11.6%. The rate was increased to a 3.5-fold rate relative to that before the ingestion of the fermented milk product (Table 7).

TABLE 7

Rate of Gut Bacteria Group of Ingesting Subject A before and after Ingestion of Edible Fermented Milk Product Including *Lactobacillus mucosae*

| Bacteria Group | Before Ingestion (%) | After Ingestion (%) |
|---|---|---|
| Bifidobacterium | 3.3 | 11.6 |
| Lactobacillales | 3.1 | 5.1 |
| Bacteroides | 50.7 | 55.1 |
| Prevotella | 1.1 | 1.3 |
| Clostridium cluster IV | 15.4 | 5.9 |
| Clostridium subcluster XIVa | 20.3 | 13.7 |
| Clostridium cluster IX | 0.0 | 0.0 |
| Clostridium cluster XI | 0.6 | 1.2 |
| Clostridium cluster XVIII | 0.0 | 1.2 |
| others | 5.5 | 4.8 |

(5) Increase of Rate of Intestinal Bifidobacteria in Ingesting Subject B

The rate of bifidobacteria in the intestine of the ingesting subject B before the ingestion of the edible fermented milk product including *Lactobacillus mucosae* was 19.9% while, after the ingestion of the fermented milk product for 14 days, the rate was increased to 25.9%. The rate was increased to a 1.3-fold rate relative to that before the ingestion of the fermented milk product (Table 8).

From the above, it turned out that the rate of bifidobacteria in the intestine was able to be increased by the fact that a human ingested a fermented milk product including *Lactobacillus mucosae* that presented the proliferation promoting activity for bifidobacteria by the culture test imitating the environment in the human intestine in Test Example 4.

TABLE 8

Rate of Gut Bacteria Group of Ingesting Subject B before and after Ingestion of Edible Fermented Milk Product Including *Lactobacillus mucosae*

| Bacteria Group | Before Ingestion (%) | After Ingestion (%) |
|---|---|---|
| Bifidobacterium | 19.9 | 25.9 |
| Lactobacillales | 2.7 | 1.5 |
| Bacteroides | 33.0 | 46.3 |
| Prevotella | 0.0 | 0.0 |
| Clostridium cluster IV | 5.9 | 6.1 |
| Clostridium subcluster XIVa | 32.5 | 17.9 |
| Clostridium cluster IX | 0.0 | 0.0 |
| Clostridium cluster XI | 0.0 | 0.0 |
| Clostridium cluster XVIII | 0.0 | 0.0 |
| others | 6.0 | 2.2 |

INDUSTRIAL APPLICABILITY

According to the present invention, a food composition that increases the diversity of the gut bacteria constituting the gut microbiota and that increases the short-chain fatty acids in the gut microbiota can be sought under the conditions that no human and no animal are used and that no human feces that are a biological sample are used, by using the model evaluation system in which the gut microbiota of Japanese is artificially reconstructed. It can be expected that an action is applied to the gut bacteria constituting the gut microbiota and the gut microbiota is thereby improved by ingesting a food, a drink, and the like including bacteria belonging to *Lactobacillus mucosae* screened using the model evaluation system as an active ingredient.

According to another present invention, the rate of bifidobacteria in the human intestinal can be increased by ingesting the fermented milk product of *Lactobacillus mucosae* that promotes proliferation of bifidobacteria in vitro. A new probiotic can thereby be provided.

[Accession Number]

Reference to Deposited Biological Material (1) SBT10028

A. Name and Address of Depositary for Depositing the Biological Material National Institute of Technology and Evaluation, Patent Microorganisms Depositary (NPMD), 2-5-8, Kazusakamatari, Kisarazu-shi, Chiba (Zip Code: 292-0818), Japan B. Date of Deposit of Biological Material to Depositary in A Sep. 15, 2020 (Date of Transfer to International Deposit: Mar. 23, 2021)

C. Accession Number Assigned for Deposit by Depositary in A

NITE BP-03275

(2) SBT10217

A. Name and Address of Depositary for Depositing the Biological Material

Same as those in (1).

B. Date of Deposit of Biological Material to Depositary in A

Sep. 15, 2020

C. Accession Number Assigned for Deposit by Depositary in A

NITE P-03276

(3) SBT10027
A. Name and Address of Depositary for Depositing the Biological Material
Same as those in (1).
B. Date of Deposit of Biological Material to Depositary in A
Sep. 15, 2020
C. Accession Number Assigned for Deposit by Depositary in A
NITE P-03274

(4) SBT10038
A. Name and Address of Depositary for Depositing the Biological Material
Same as those in (1).
B. Date of Deposit of Biological Material to Depositary in A
Sep. 15, 2020
C. Accession Number Assigned for Deposit by Depositary in A
NITE P-03283

(5) SBT2261
A. Name and Address of Depositary for Depositing the Biological Material
Same as those in (1).
B. Date of Deposit of Biological Material to Depositary in A
Sep. 15, 2020
C. Accession Number Assigned for Deposit by Depositary in A
NITE P-03272

(6) SBT2027
A. Name and Address of Depositary for Depositing the Biological Material
Same as those in (1).
B. Date of Deposit of Biological Material to Depositary in A
Sep. 15, 2020
C. Accession Number Assigned for Deposit by Depositary in A
NITE P-03271

(7) SBT2271
A. Name and Address of Depositary for Depositing the Biological Material
Same as those in (1).
B. Date of Deposit of Biological Material to Depositary in A
Sep. 15, 2020
C. Accession Number Assigned for Deposit by Depositary in A
NITE P-03273

(8) SBT10043
A. Name and Address of Depositary for Depositing the Biological Material
Same as those in (1).
B. Date of Deposit of Biological Material to Depositary in A
Mar. 27, 2020 (Date of Transfer to International Deposit: Mar. 23, 2021)
C. Accession Number Assigned for Deposit by Depositary in A
NITE BP-03187

(9) SBT2025
A. Name and Address of Depositary for Depositing the Biological Material
Same as those in (1).
B. Date of Deposit of Biological Material to Depositary in A
Mar. 27, 2020
C. Accession Number Assigned for Deposit by Depositary in A
NITE P-03189

(10) SBT2268
A. Name and Address of Depositary for Depositing the Biological Material
Same as those in (1).
B. Date of Deposit of Biological Material to Depositary in A
Mar. 27, 2020
C. Accession Number Assigned for Deposit by Depositary in A
NITE P-03190

(11) SBT2269
A. Name and Address of Depositary for Depositing the Biological Material
Same as those in (1).
B. Date of Deposit of Biological Material to Depositary in A
Mar. 27, 2020
C. Accession Number Assigned for Deposit by Depositary in A
NITE P-03191

(12) SBT2867
A. Name and Address of Depositary for Depositing the Biological Material
Same as those in (1).
B. Date of Deposit of Biological Material to Depositary in A
Mar. 27, 2020
C. Accession Number Assigned for Deposit by Depositary in A
NITE P-03192

(13) SBT10228
A. Name and Address of Depositary for Depositing the Biological Material
Same as those in (1).
B. Date of Deposit of Biological Material to Depositary in A
Mar. 27, 2020
C. Accession Number Assigned for Deposit by Depositary in A
NITE P-03188

What is claimed is:

1. A method for improving gut microbiota in a subject, comprising administering to the subject a composition comprising cells or a culture of *Lactobacillus mucosae* SBT10028 strain having Accession No. NITE BP-03275.

2. The method of claim 1, said composition is a food or drink.

3. The method of claim 1, said composition is a drug for promoting the growth of Bifidobacteria.

* * * * *